(12) United States Patent
Duden et al.

(10) Patent No.: US 6,511,334 B1
(45) Date of Patent: Jan. 28, 2003

(54) BIRDCAGE TORSION HARNESS ASSEMBLY FOR ROTATING GIMBAL

(75) Inventors: Quint Duden, Tucson, AZ (US); Zac Seasly, Tuscon, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/481,092

(22) Filed: Jan. 11, 2000

(51) Int. Cl.[7] ................................................ H01R 3/00
(52) U.S. Cl. ...................................................... 439/164
(58) Field of Search ................................ 439/162, 164, 439/11, 13; 74/5.6 D, 5.6 E

(56) References Cited

U.S. PATENT DOCUMENTS

| | | | |
|---|---|---|---|
| 2,702,889 A | * | 2/1955 | Bareford |
| 3,251,955 A | * | 5/1966 | Erickson |
| 3,512,264 A | * | 5/1970 | Ambrosini |
| 3,597,721 A | * | 8/1971 | Mangan |
| 3,916,086 A | * | 10/1975 | Gillemot et al. ............... 174/93 |
| 3,964,814 A | * | 6/1976 | Kalbitz et al. |
| 4,468,070 A | * | 8/1984 | Yasuoka |
| 4,693,527 A | * | 9/1987 | Bonenberger |
| 4,936,427 A | * | 6/1990 | Ferree ........................ 191/12 R |
| 5,225,648 A | * | 7/1993 | Torii et al. ..................... 901/42 |
| 5,226,831 A | * | 7/1993 | Horiuchi ...................... 439/164 |

* cited by examiner

*Primary Examiner*—Neil Abrams
(74) *Attorney, Agent, or Firm*—Williiam J. Benman, Jr.; Colin M. Raufer; Glenn H. Lenzen, Jr.

(57) ABSTRACT

A birdcage-shaped harness assembly adaptable for electrically connecting a bulkhead support structure with a rotatable gimbal support structure. In order to avoid excessive torsional forces from acting on the harness, a plurality of conductor portions are bundled together and pre-compressed in length between the support structures. When assembled, the conductor portions of the harness assembly form a birdcage-shaped dynamic bundle wherein the middle of the conductor portions bow away from conductor portions on the opposite side of the bundle. This pre-compression creates a birdcage-shaped configuration that allows the bundle to bend as the conductor portions straighten. This occurs when the gimbal rotates relative to the bulkhead. The bending motion creates relatively little damage to the conductor strands as compared the excessive torsion forces affecting conventional loop-shaped wire harness assemblies.

9 Claims, 5 Drawing Sheets

BIRDCAGE TORSION HARNESS ASSEMBLY FOR ROTATING GIMBAL

BACKGROUND OF THE INVENTION

1. Field of the Invention

The present invention relates to a harness assemblies. More specifically, the present invention relates to harness assemblies for rotating gimbals.

2. Description of the Related Art

In a gimbaled system, one or more gimbals are typically supported for movement relative to a stationary support member. In order to electrically connect components mounted on the gimbal with the stationary support member, a number of conductors are bundled together in what is conventionally referred to a harness assembly.

Conventional harness assemblies often employ a torsion-loop design. These designs exercise, stretch, bend or twist the conductors, resulting in the generation of both torsion and bending stress. The tighter the bend radius and the larger the dynamic range, the greater the stress on the conductors when the harness cycles through its range of motion. To ensure proper movement of the gimbal and harness, the packaging of the harness loop is made relatively loose.

However, the packaging for conventional torsion-loop designed harnesses usually does not allow for axial displacement. This can result in a moment that multiplies the restrictive force caused by the harness. This force translates against the motor driving the mechanism. As a result, the performance of conventional torsion-loop harnesses tends to degrade sharply with the addition of each conductor and shield added to the bundle.

Of major concern in any electrical circuit is Electro-Magnetic-Interference (EMI) which is commonly referred to as "noise". When least offensive, EMI still can serve to reduce the effectiveness of any electromechanical assembly. EMI can render such an assembly useless.

Another drawback of conventional harness systems resides in the fact that such systems function as miniature antennas by intercepting and introducing electro-magnetic waves into the assembly. Designers of conventional harness systems, in an attempt to reduce the effect of harness noise, first measure the input in magnitude and frequency and then incorporate filters into the design to compensate for the noise. This approach tends to be somewhat successful for stationary harnesses and antennas. However, the problem can not be solved so easily when the harness is dynamic as with cross-gimbal systems. In cross-gimbal harness assemblies, the harness not only picks up and amplifies existing EMI, but also actually creates EMI.

As is known in the art, when an electrical current passes through a wire, and that wire is moving through space, an electromagnetic field is created (Faraday's motor principle). This phenomenon is referred to as capacitive interference.

Torsion-loop harnesses also tend to be very sensitive to G force inputs. When employed in a missile seeker assembly and the entire seeker is put under heavy G forces as occur during flight, the loop harness assembles are susceptible to "flopping " around and possibly interfering with one another or with the gimbal components. In addition, because torsion-loop harnesses require tight bend radii, the conductor strands and shielding may undergo some plastic deformation which, in turn, increases the force required to overcome or extend the harness. Plastic deformation also introduces work hardening of the conductor material in the harness. Work hardening occurs as the bend radius is extended and retracted in order to accommodate gimbal motion. In addition, over time the metal material in the bundle of conductors begins to "creep" or cold flow at the location of the tight bend radius. Cold flow causes the loop harness assembly to develop a memory. This is undesirable in closed loop control systems. In effect, material work hardening and material creep adversely effect the performance of the loop harness over cycle time. When the performance of the loop is degraded, the performance of the gimbal will also be degraded.

Thus, there is a need in the art for a harness assembly that is easy to assemble, robust in nature, and exhibits performance that is exactly repeatable.

SUMMARY OF THE INVENTION

The need in the art is met by the unique, birdcage, torsion harness assembly of the present invention. The present invention provides a torsion harness assembly that avoids the undesirable characteristics associated with known torsion-loop harness assemblies. The birdcage harness assembly consists of a plurality of separate conductors, many twisted and shielded, that are capable of transmitting signals and power from a fixed position bulkhead support mechanism and nearby circuit cards to and across an outer gimbal to various gimbal components. The birdcage-shaped harness combines three separate harness designs extending to various components into one compressed bundle of continuous conductor strands that extend between the bulkhead and the outer gimbal. Preferably, the birdcage-shaped portion of the harness extends from the bulkhead along the axis of rotation of the gimbal into connection with block mounted on the gimbal from which a number of separate harness bundles extend to the gimbal supported components. By following the gimbal axis of rotation, the birdcage harness eliminates a moment arm multiplier and is thereby less sensitive to conductor/shield material on the bundle. In comparison, a conventional loop harness usually locates the bending stress away from the axis of rotation, creating a torque arm and increasing the force acting on the harness system.

When assembled, a first portion of the bundle of conductor strands are attached, preferably by gluing into a top potting block clamped to the rotating gimbal body. Individual conductor/shields exit the bottom of the clamp and are formed in equal lengths. While the actual number of conductors forming the bird cage portion of the harness assembly is considered a design choice, it has been found that up to approximately 35 conductors and/or shields can be bundled together in the present invention. Each of the conductors preferably extends substantially one (1) inch from the top potting block until being received in an opening formed in a lower potting block. The actual length of the various strands is considered a design choice, however, the lengths of the portions of the strands extending between the upper and lower potting blocks should be substantially the same. While the preferred embodiment of the invention employs continuous strands extending from the bulkhead to the gimbal components, it is considered within the scope of the invention to employ separate strands for each portion, which strands are connected to form a continuous electrical connection. A lower potting clamp mounted on the bulkhead is employed to frictionally compress the lower potting block into fixed attachment with the plurality of conductors forming the birdcage portion of the harness, thereby preventing the birdcage conductors from separating from the bulkhead. A plurality of separate bundles of conductors extend from the lower potting block to various components mounted on the bulkhead support mechanism, thereby forming electrical connections between the gimbal mounted components and bulkhead mounted components.

The lower potting block is mounted on the bulkhead or sensor support at a set distance from the upper potting block carefully determined such that the plurality of conductor strands extending from the gimbal to the bulkhead form a substantially bird cage configuration. In particular, the bundle of conductor strands are each bowed in a generally outwardly direction from the axis of the bundle which coincides with the axis of rotation of the gimbal member. The predetermined amount of "birdcaging" or bowing of the various individual conductor strands may easily be controlled by controlling the axial separation of the lower and upper potting blocks.

At first inspection, the birdcage-shaped torsion harness of the present invention appears to move or navigate with the gimbal in pure torsion. While it is true that the bowed conductors do twist as the gimbal moves though an angle of rotation, it becomes clear that the individual conductor strands primarily move in bending. Because the individual strands are pre-compressed into their initial bowed or birdcage-shaped positions, movement of the gimbal has the effect of providing slack that is taken up in the strands as the gimbal rotates relative to the fixed position sensor. In effect, the conductor strands bend or stretch from their respective bowed configurations until they reach substantially linear shape. The conductor strands then bend back into their original bowed shapes as the gimbal rotates back to its original neutral position.

An advantage of the present invention resides in the effective reduction of the size of the harness package as compared to conventional loop harnesses. In particular, loop harnesses extending between the support and gimbal are required to be substantially longer than the preferred approximate one (1) inch length of the birdcage conductors. The loop conductors must be longer because they require a relatively large "swing" or range of motion per angle of rotation of the gimbal. Besides reducing the package size of the harness assembly, the birdcage design eliminates the high stress normally inherent in harness assemblies facing large angles of rotation of the gimbal. In addition, the birdcage harness is not G sensitive, and dramatically reduces spring torque and friction input to gimbaled system components caused by conventional loop harness assemblies.

DESCRIPTION OF THE INVENTION

Figure 1:
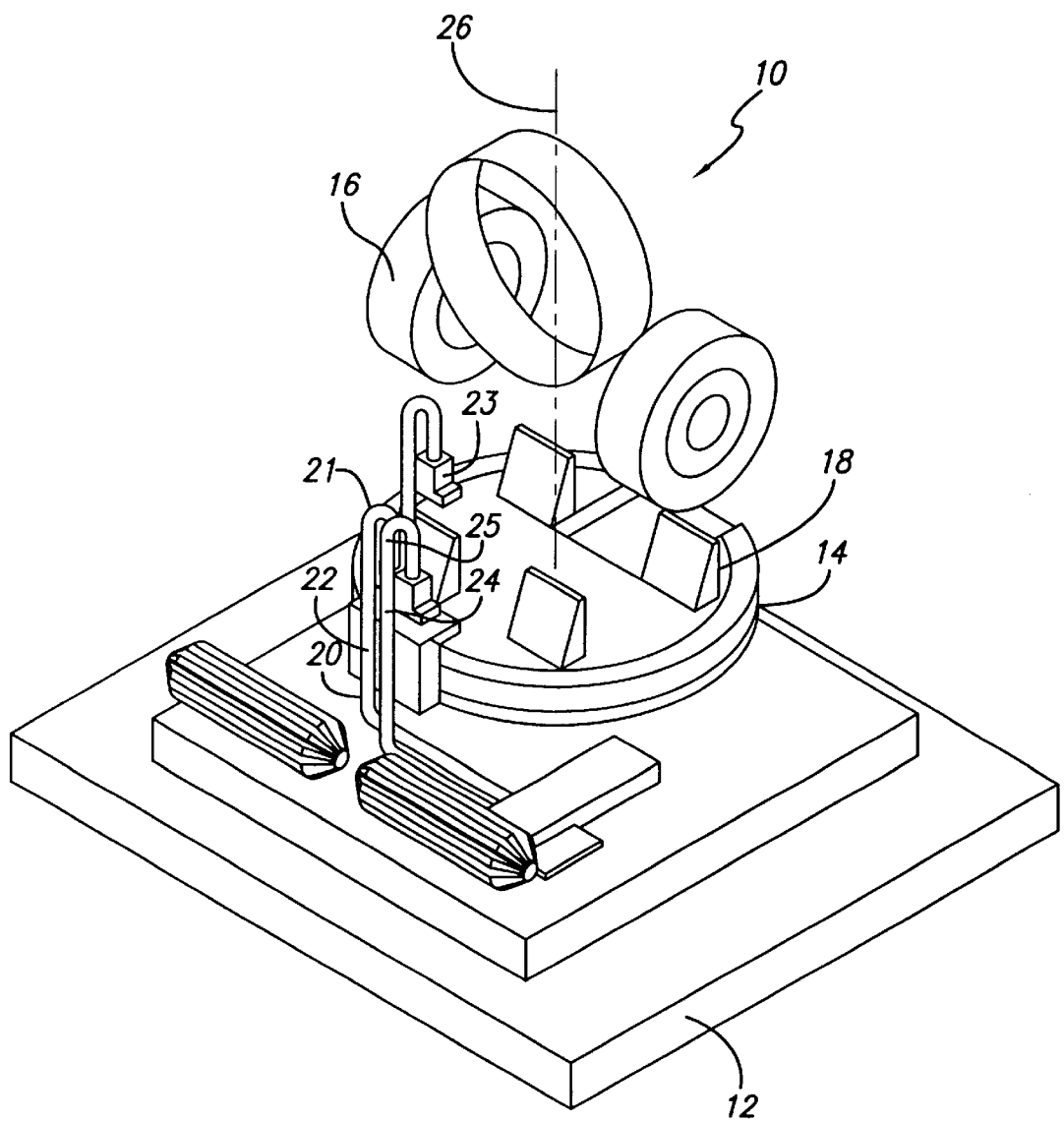
FIG. 1 is a perspective view of a prior art loop harness assembly.

Illustrative embodiments and exemplary applications are described below with reference to the accompanying drawings in order to disclose the advantageous teachings of the present invention.

As will be explained below, the present invention is unique in its ability to reduce the EMI problem described above as compared with existing harness assembles by minimizing the movement of the wire forming the bundles. Known "twist cap" wire arrangements require relatively long wires and incorporate a geometry which requires the wires to fold and slide over one another as the gimbal navigates across a specified angle. This movement is quantified as $D \cong 2\pi d(\emptyset/360)$, where d is the diameter of a twist cap and $\emptyset$ is the gimbal angle navigated. An average diameter for a twist cap housing including 30–40 conductors is about 2 inches. For a twist cap navigating 180 degrees D (movement of the wires) equates to about 6 inches. By comparison, the present invention employs conductors undergoing movement of between 0.050 inches and 0.100 inches. As can be readily understood, the capacitive EMI created by a harness constructed in accordance with the present teachings will be substantially less than that of the existing twist cap harness design.

Reference is made now to the drawings wherein like reference numerals designate like elements throughout.

FIG. 1 is a perspective view of a prior art loop harness assembly. The conventional, prior art loop harness assembly is shown at 10. The gimbal harness design of FIG. 1 includes a fixed support or bulkhead member 12 and a rotatable gimbal assembly 14 spaced therefrom. Gimbal assembly 14 includes, among other components, an IG resolver 16 and a gyro 18. A plurality of separate wire harness assemblies 20, 22 and 24 extend between support 12 and gimbal assembly 14. As noted, each harness is doubled up at 21, 23 and 25 respectively, and forced to bend or loop to provide dynamic service slack as gimbal assembly 14 rotates relative to support 12. Because harness assemblies 20, 22 and 24 are positioned away from the axis of rotation 26 of gimbal assembly 14, a torque arm is created which increases the force acting on gimbal assembly 14.

Figure 2:
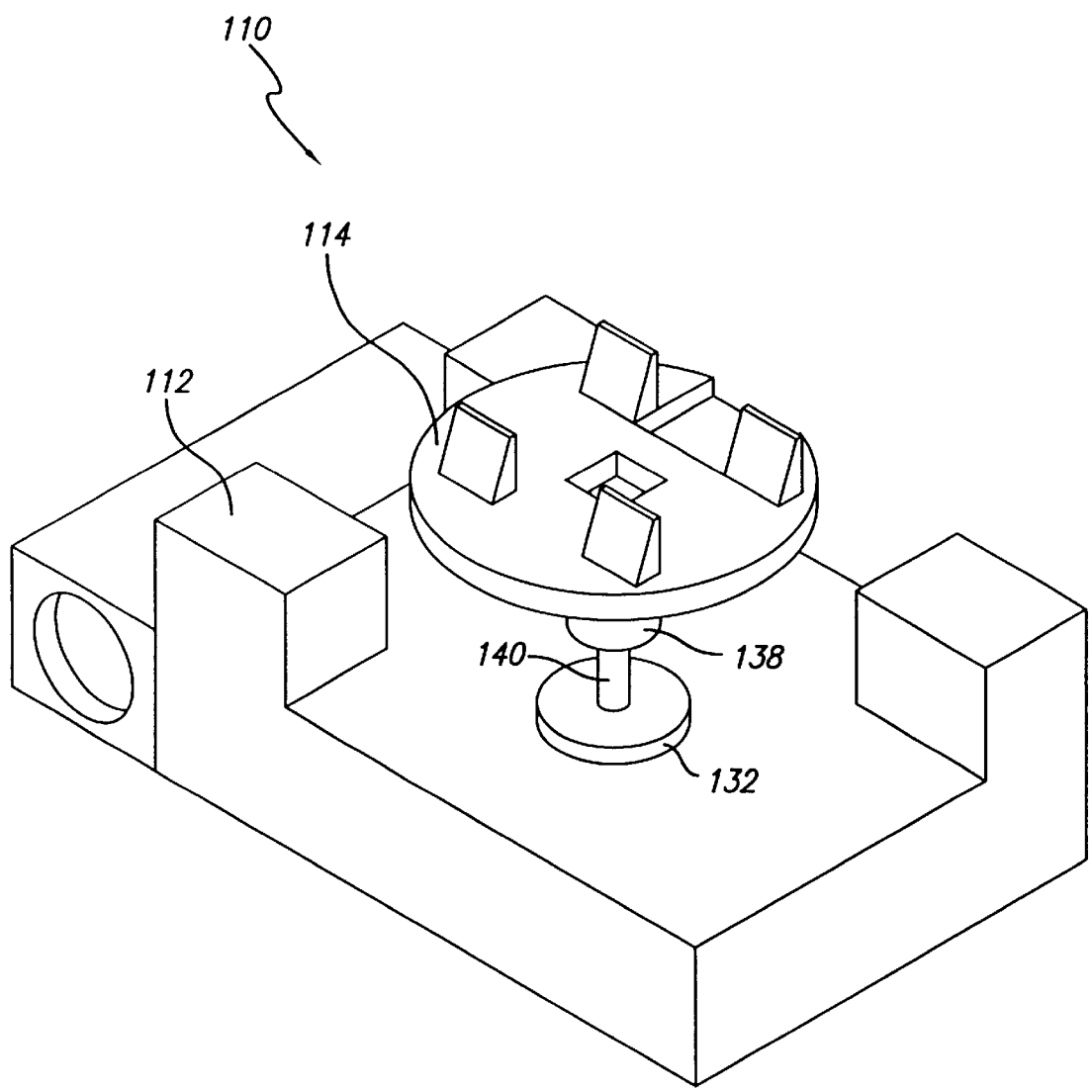
FIG. 2 is a perspective view of a birdcage harness assembly formed in accordance with the present invention.

Attention is directed to FIG. 2 which shows a birdcage torsion harness assembly 110 formed in accordance with the present invention. Harness assembly 110 is mounted between two spaced-apart mechanisms 112 and 114 capable of relative movement. One mechanism comprises a fixed support member or bulkhead identified at 112. A second mechanism spaced therefrom consists of an outer, movable gimbal body 114. Gimbal body 114 preferably supports a number of separate components.

Figure 3:
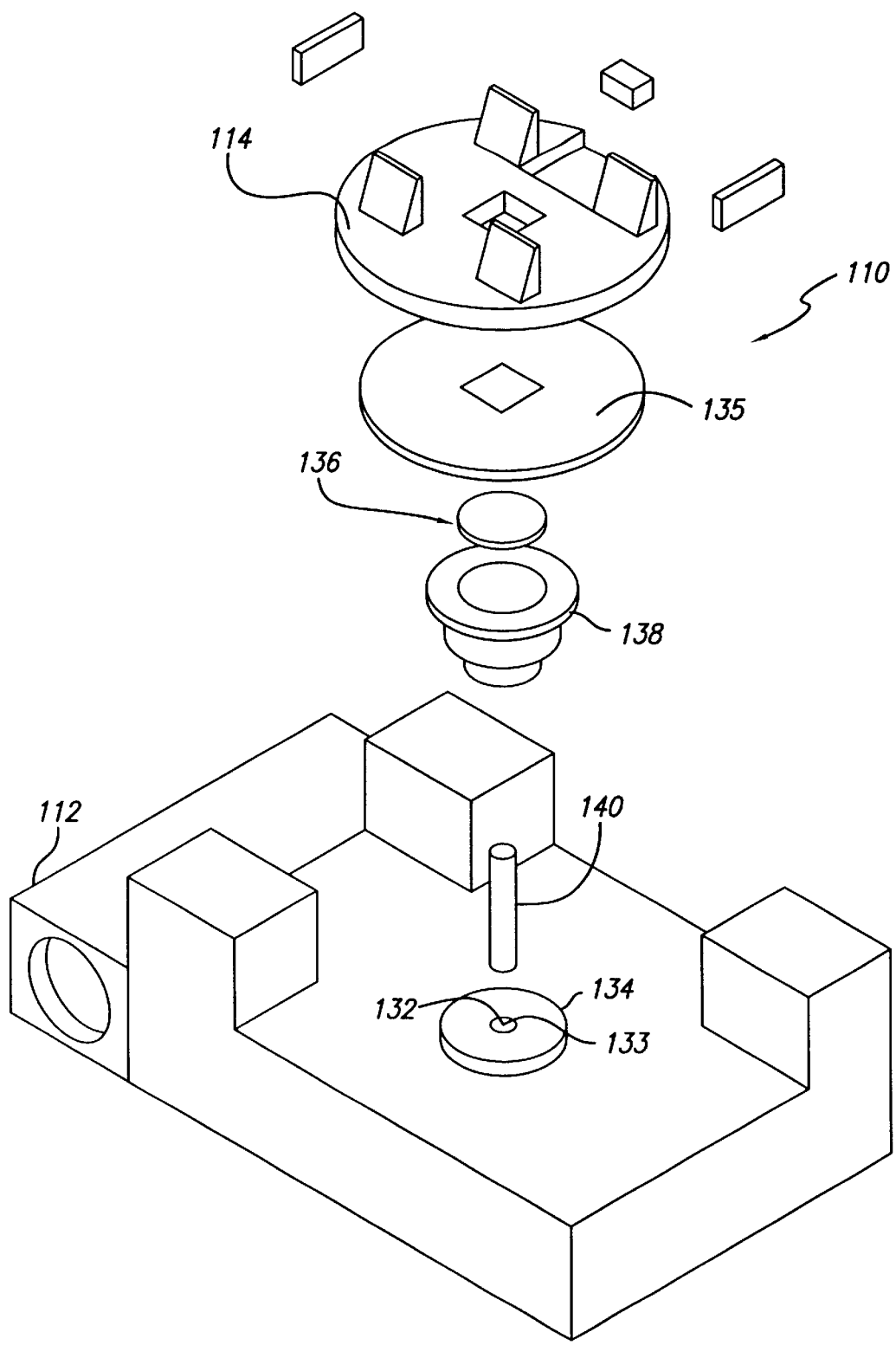
FIG. 3 is an exploded view of the birdcage harness assembly of FIG. 2.

FIG. 3 is an exploded view of the birdcage harness assembly of FIG. 2. An outer gimbal 114 is shown aligned above bulkhead 112 in the exploded view. Also shown in exploded view are various components making up birdcage torsion harness assembly 110. These components include a lower potting block 132, a lower potting clamp 134, an attachment plate 135, a top potting block 136 and a top potting clamp 138. The single bundle of conductor strands is shown at 140.

Figure 4:
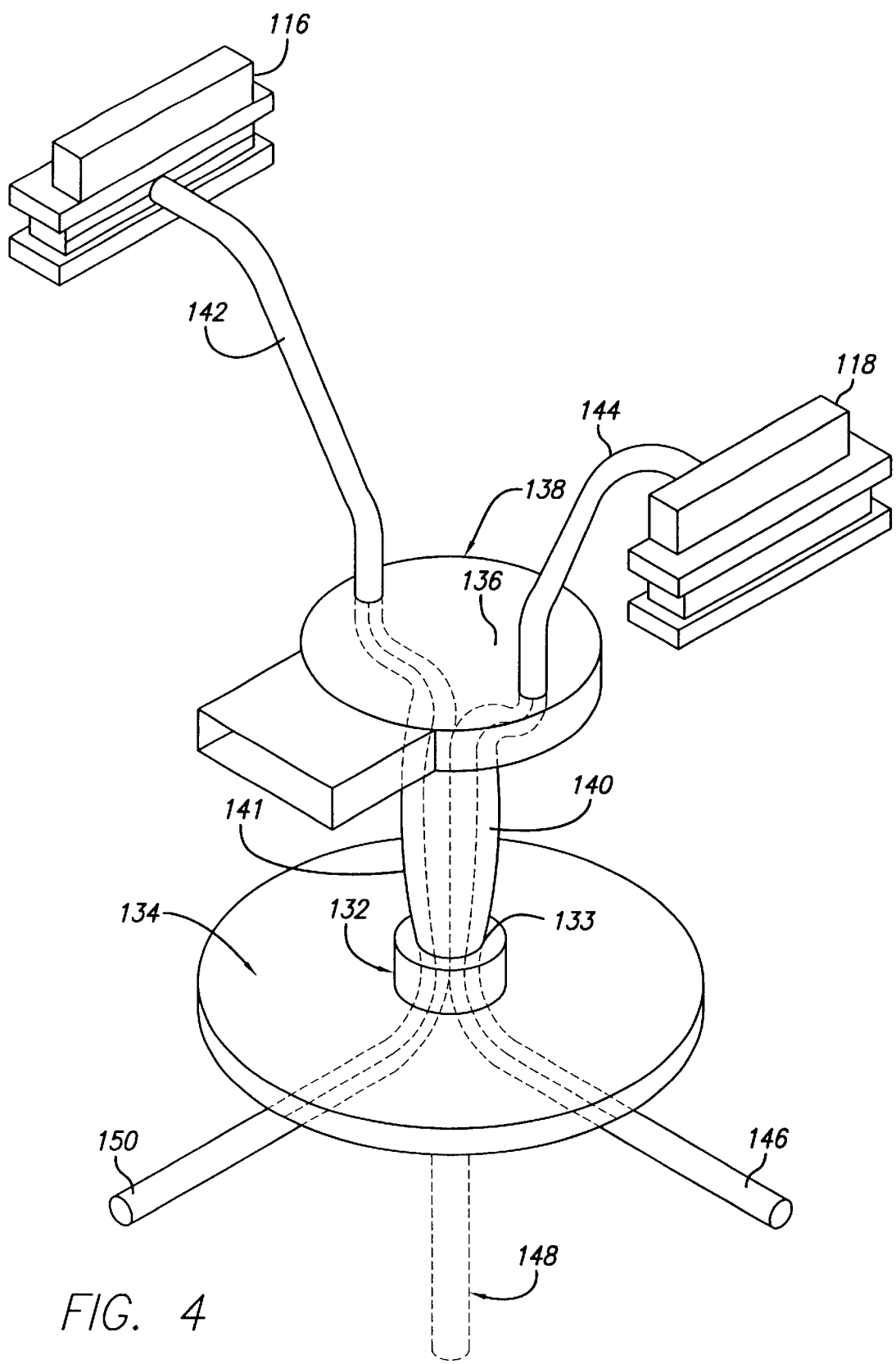
FIG. 4 is view of a portion of the birdcage harness assembly of FIG. 2.

FIG. 4 shows separate harness assembles 142 and 144, supporting separate gimbal functions, extend within openings in top potting block 136 and are preferably glued together with epoxy to prevent separation. These end portions of harness assemblies 142 and 144 pass through upper potting block 136 and form the end portions of conductors 141. A dynamic bundle 140 is formed by the plurality of conductors 141. The conductors extend toward the lower potting block 132. A dynamic electrical connection is formed from IG connector 116 and Gyro connector 118, through top potting block 136, and through conductors 141. As shown in FIG. 4, each of the conductors 141 extends into an opening 133 in lower potting block 132 only to exit on the other side of potting block 132 as three separate harnesses 146, 148 and 150, respectively. Each of the harness bundles 146, 148 and 150 joins with a component, not shown, mounted on bulkhead 112. This assembly of conductors creates a harness assembly that, at the end portions, takes the configuration of a plurality of separate harnesses and in middle portion acts as a dynamic bundle 140. The result is a continuous electrical connection between bulkhead support components and gimbal mounted components.

The number of components mounted on bulkhead 112 and gimbal 116 are considered to be design choices. It is important that harness assembly 110 establish continuous electrical connections between the various components and that the electrical connections be maintained even as gimbal 114 rotates relative to support bulkhead 112. Whether each electrical connection between bulkhead 112 and gimbal 114 is, preferably, formed by a single, continuous stand of conductor material or is formed by a plurality of conductors joined end-to-end is also considered a design choice.

When forming harness assembly 110, top potting block 136 is preferably poured into top clamp 138, with the assembled members then joined to attachment plate 135 which is itself attached to gimbal 114. At its side facing lower potting block 132, top potting block 136 has a single opening for receiving the bundle of conductors 140.

FIG. 4 is view of a portion of the birdcage harness assembly of FIG. 2. As shown in FIG. 4, the opposite side of top potting block 136 includes a number of openings. Each opening receives one of the harness bundles 142 and 144 extending from IG Power Connector 116 or Gyro connector 118, respectively.

The lower potting block 132 is formed in a tool separate from lower potting clamp 134. When fixed to support bulkhead 112, potting clamp 134 acts to compress lower potting block 132, wherein potting block 132 frictionally engages the birdcage shaped bundle of conductor strands 141, preventing the individual strands 141 from moving relative to bulkhead support 112.

FIG. 4 shows in more detail the relationship between a bundle of birdcage-shaped conductor strands 141 and each of the potting blocks 132 and 136, respectively. As shown in FIG. 4, gimbal-mounted components may include an IG Power Connector 116 and a gyro connector 118. In place of the three separate wire harnesses 20, 22 and 24 employed in the prior art harness assembly 10 and extending between bulkhead 12 and gimbal 14, the present invention utilizes a torsion harness assembly including a single bundle of conductors 140 extending between bulkhead 112 and 114. The bundle 140 comprises a plurality of separate conductors 141 that, taken as a whole, form a birdcage-shaped configuration. Bundle 140 preferably extends along the rotational axis 126 of gimbal body 114 and is capable of electrically connecting bulkhead 112 with gimbal body 114.

As shown, each of the plurality of individual conductors 141 forming bundle 140 bows slightly outwardly from oppositely disposed strands, thereby forming the distinctive birdcage configuration.

Figure 5:
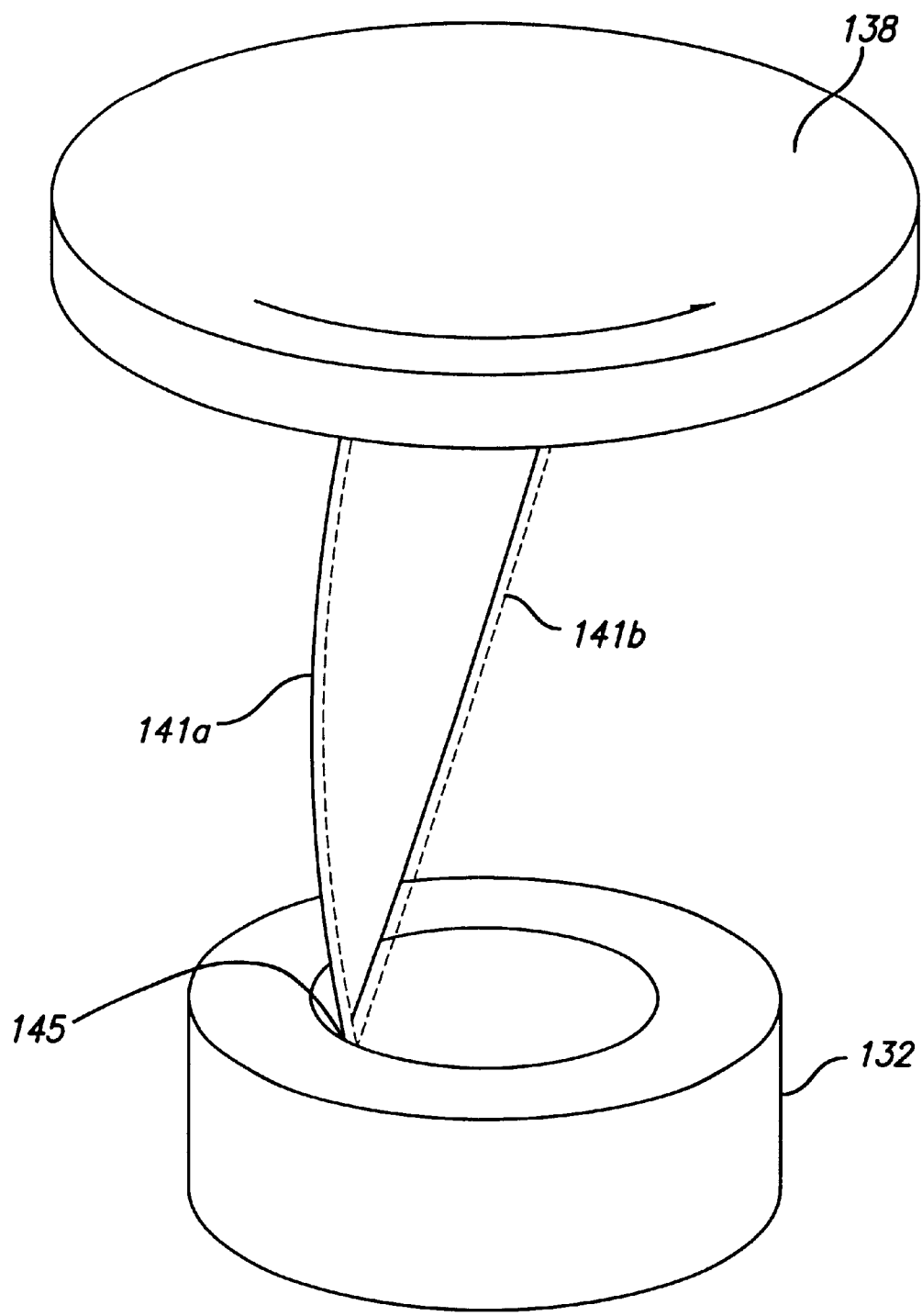
FIG. 5 illustrates the movement of a conductor employed in the birdcage harness assembly of the present invention.

FIG. 5 illustrates the movement of a conductor employed in the birdcage harness assembly of the present invention. As shown in FIG. 5, the unique birdcage shape results from the middle portions 143 of each conductor strand 141 being spaced a greater distance from the rotational axis 126 of gimbal 114 than the respective opposite end portions 145 of each conductor 141. The birdcage configuration of bundle 140 is considered unique to the present invention and allows the individual conductors 141 to undergo primarily bending motion as opposed to the excessive torsional stresses encountered by loop harness conductors as will be explained.

FIG. 5 shows various positions of a single conductor strand 141 when attached at its one end to lower potting block 132 and at an opposite end to top potting block 136. In its normal position, achieved when bulkhead 112 and gimbal 114 are at rest, conductor strand 141 assumes the position shown at 141$a$, wherein the bowed configuration of the strand is achieved by pre-compression of the ends of strand 141. The amount of pre-compression is controlled by the separation of top and lower potting blocks 136 and 132, respectively. When gimbal body 114 and its attached top potting block 136 undergo rotation through an angle Ø relative to bulkhead 112 and its lower potting block 132, each conductor strand 141 assumes the position and shape shown at 141$b$. The movement of the strand 141 from the position of 141$a$ to 141$b$ requires the strand to twist and bend. By bending, the initial compression of strand 141$a$ is, in effect, taken up and strand 141$a$ straightens out until it achieves the substantially straight configuration of 141$b$.

When gimbal 114 proceeds to rotate in the opposite direction toward its neutral position, each extended strand 141$b$ will again be compressed into its pre-compressed shape at 141$a$. If the rotation carries gimbal 114 beyond its neutral or rest position, the strands 141$a$ will bend in the opposite direction until they achieve the configuration of strand 141$b$. During operation, the strands 141 move to position 141$a$, each strand moves a distance of between 0.05 inches and 0.10 inches. This small distance significantly reduces the EMI created by the strands 141 as compared to existing harness assemblies.

The birdcage torsion harness assembly of the present invention substantially eliminates the need for three separate harnesses each routed in a free 180° loop, positioned off center from the rotation axis of outer gimbal 114. Instead, the birdcage harness assembly 110 includes a single bundle 140 of conductors 141 preferably routed along the center axis of the movable gimbal and then separated into distinct harnesses to electrically connect with components mounted on gimbal 114.

Thus, the present invention has been described herein with reference to a particular embodiment for a particular application. Those having ordinary skill in the art and access to the present teachings will recognize additional modifications, applications and embodiments within the scope thereof. Although the invention has been shown as being applicable to a missile mounted seeker assembly, it is in no way limited to this application. Basically mechanisms that undergoes axial motion relative to another mechanism and requires a harness assembly to connect the mechanisms despite the relative movement should benefit from the present invention. Examples of systems that could benefit include, but are not limited to, radar, automated production machines and robots.

It is therefore intended by the appended claims to cover any and all such applications, modifications and embodiments within the scope of the present invention.

Accordingly,

What is claimed is:

1. An improved harness assembly capable of electrically joining components mounted on a bulkhead support structure with components mounted on a gimbal structure spaced-apart from and capable of rotating relative to the bulkhead support, said improved harness assembly comprising:

first hollow potting block attached to the bulkhead support and a second hollow potting block attached to the gimbal structure;

a plurality of separate wire conductors each having a first end received within the first potting block and each having a second end received within the second potting block;

a first clamping member surrounding a portion of the first potting block for compressing the first potting block into frictional contact with the plurality of wire conductors, thereby prevents the wire conductors from moving within and separating from the first potting block;

a second clamping member surrounding a portion of the second potting block for compressing the second potting block into frictional contact with the plurality of wire conductors, thereby prevents the wire conductors from moving within and separating from the second potting block;

the first and second potting blocks being spaced-apart from one another a predetermined distance such that the plurality of separate wire conductors are aligned with one another and arranged in a substantially circular configuration having a longitudinal axis extending substantially parallel to the rotational axis of the gimbal support structure, with said wire conductors precompressed to bow away from one another, forming a substantially birdcage-shaped configuration;

a first plurality of wire harnesses having first end portions forming electrical connections with the plurality of wire conductors and having second end portions forming electrical connections with various components mounted on the bulkhead support; and a second plurality of wire harnesses having first end portions forming electrical connections with the plurality of wire conductors and having second end portions forming electrical connections with various components mounted on the gimbal support structure, thereby maintaining continuous electrical connections between the components mounted on the bulkhead support and the components mounted on the bulkhead support even as the gimbal support structure rotates relative to the bulkhead support structure.

2. The improved harness assembly according to claim 1 wherein the first hollow potting block has a first side with a centrally disposed, substantially circular opening for receiving the plurality of wire conductors and has a second side with a plurality of openings wherein each opening receives an end portion of one of the first plurality of wire harnesses, thereby forming a continuous electrical connection within the first potting block between the plurality of wire conductors and the first plurality of wire harnesses.

3. The improved harness assembly according to claim 2 wherein the second hollow potting block mounted on the gimbal support structure has a first side with a centrally disposed, substantially circular opening for receiving the plurality of wire conductors and has a second side with a plurality of openings, wherein each opening receives an end of one of the second plurality of wire harnesses, thereby forming an electrical connection between the plurality of wire conductors and the second plurality of wire harnesses.

4. The improved harness assembly of claim 1 wherein the plurality of bowed wire conductors each extends substantially one inch between the first and second potting blocks, respectively.

5. The improved harness assembly of claim 1 wherein each of the wire conductors forming the birdcage-shaped configuration is capable of movement in a range of approximately 0.05–0.10 inches as the gimbal structure rotates relative to the bulkhead support.

6. An improved harness assembly for electrically joining components mounted on a bulkhead support with components mounted on a rotatable gimbal support structure, comprising:

a pair of spaced-apart hollow blocks, each block being fixedly mounted on either the bulkhead or gimbal support members;

a plurality of separate wire conductors, each wire conductor having one end extending within one of the hollow blocks and having an opposite end extending within the other hollow block, with said plurality of separate wire conductors pre-compressed to bow outwardly from each other with the longitudinal axis of each of the wire conductors extending substantially parallel to the rotational axis of the gimbal support member and capable of movement in the range of approximately 0.05–0.10 inches as the gimbal rotates relative to the bulkhead support;

a first clamping member frictionally compressing one of the hollow blocks into contact with an end of each of the plurality of wire conductors;

a second clamping member frictionally compressing the other hollow block into contact with an opposite end of each of the plurality of wire conductors; and each of the hollow blocks being spaced-apart from the opposite block a predetermined distance such that the plurality of conductors are pre-compressed.

7. The harness assembly according to claim 6 wherein a first plurality of wire harnesses have first ends electrically connected to various components mounted on the bulkhead support member and have second ends extending within the one hollow block and electrically connected to the plurality of wire conductors.

8. The harness assembly according to claim 6 wherein a second plurality of wire harnesses have first ends electrically connected to various components mounted on the gimbal support member and have second ends extending within the other hollow block and electrically connected to the plurality of wire conductors.

9. The harness assembly according to claim 6 wherein the plurality of wire conductors form a substantially circular configuration.

* * * * *